(12) United States Patent
Agrawal et al.

(10) Patent No.: US 10,296,860 B2
(45) Date of Patent: May 21, 2019

(54) MANAGEMENT OF AIRCRAFT IN-CABIN ACTIVITIES OCCURING DURING TURNAROUND USING VIDEO ANALYTICS

(71) Applicant: AIRBUS GROUP INDIA PRIVATE LIMITED, Bangalore (IN)

(72) Inventors: Ashutosh Agrawal, Bangalore (IN); Anmol Pandey, Jabalpur (IN)

(73) Assignee: AIRBUS GROUP INDIA PRIVATE LIMITED, Bangalore, Karnataka (IN)

(*) Notice: Subject to any disclaimer, the term of this patent is extended or adjusted under 35 U.S.C. 154(b) by 616 days.

(21) Appl. No.: 15/049,021

(22) Filed: Feb. 20, 2016

(65) Prior Publication Data
US 2016/0247101 A1    Aug. 25, 2016

(30) Foreign Application Priority Data

Feb. 20, 2015 (IN) .............................. 819/CHE/2015

(51) Int. Cl.
*G06Q 10/06* (2012.01)
*G06Q 50/30* (2012.01)
*B64D 47/08* (2006.01)
*G06K 9/00* (2006.01)

(52) U.S. Cl.
CPC ......... *G06Q 10/0633* (2013.01); *B64D 47/08* (2013.01); *G06K 9/00771* (2013.01); *G06K 9/00832* (2013.01); *G06Q 50/30* (2013.01)

(58) Field of Classification Search
CPC ........ G06Q 50/30; G06Q 50/32; B64D 47/08; G06K 9/00771; G06K 9/00785; G06K 9/00791; G06K 9/00832

USPC ....... 382/103–104, 100, 154, 181; 358/1.15; 705/7.11–7.28

See application file for complete search history.

(56) References Cited

U.S. PATENT DOCUMENTS

| | | | |
|---|---|---|---|
| 2008/0219504 A1* | 9/2008 | Adams | G06Q 30/02 382/103 |
| 2009/0167881 A1* | 7/2009 | Thorn | H04N 5/23219 348/222.1 |
| 2011/0142284 A1* | 6/2011 | Shepherd | F41G 3/14 382/103 |
| 2014/0133692 A1* | 5/2014 | Spata | G06F 11/3476 382/100 |
| 2016/0195867 A1* | 7/2016 | Lamers | G05B 19/402 700/100 |

* cited by examiner

*Primary Examiner* — Dwayne D Bost
*Assistant Examiner* — Stephen M Brinich
(74) *Attorney, Agent, or Firm* — Prakash Nama; Global IP Services, PLLC

(57) ABSTRACT

A system and method for aircraft cabin activity management occurring during turnaround using video analytics are disclosed. In one embodiment, real-time video feed of the aircraft cabin activities is obtained during the turnaround from at least one video camera disposed in an aircraft cabin. Further, aircraft cabin activity time stamps and progress associated with one or more aircraft cabin activities are determined by applying video analytics on the obtained video feed. Furthermore, the aircraft cabin activities are managed using the determined aircraft cabin activity time stamps and the progress associated with the one or more aircraft cabin activities.

21 Claims, 10 Drawing Sheets

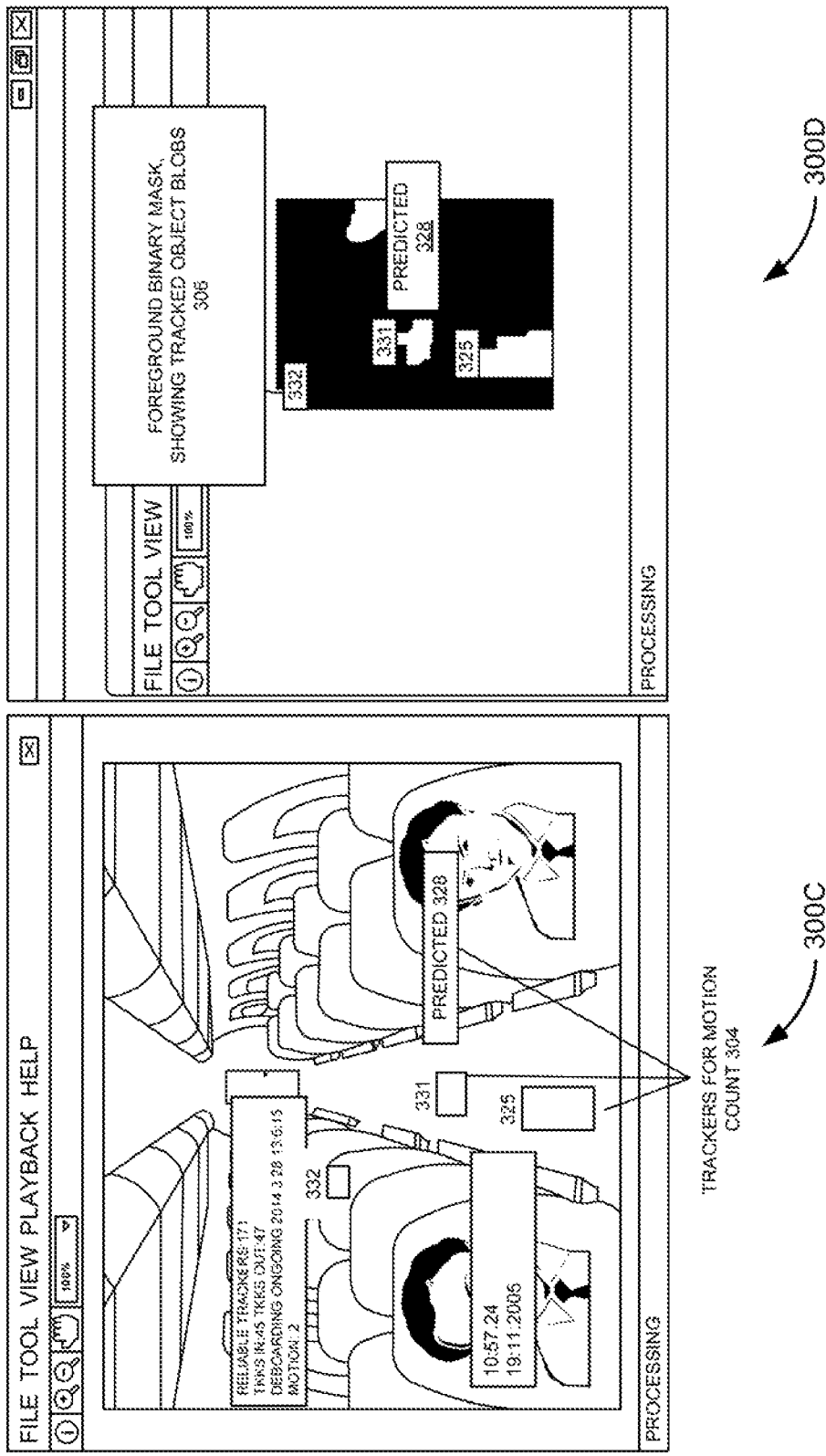

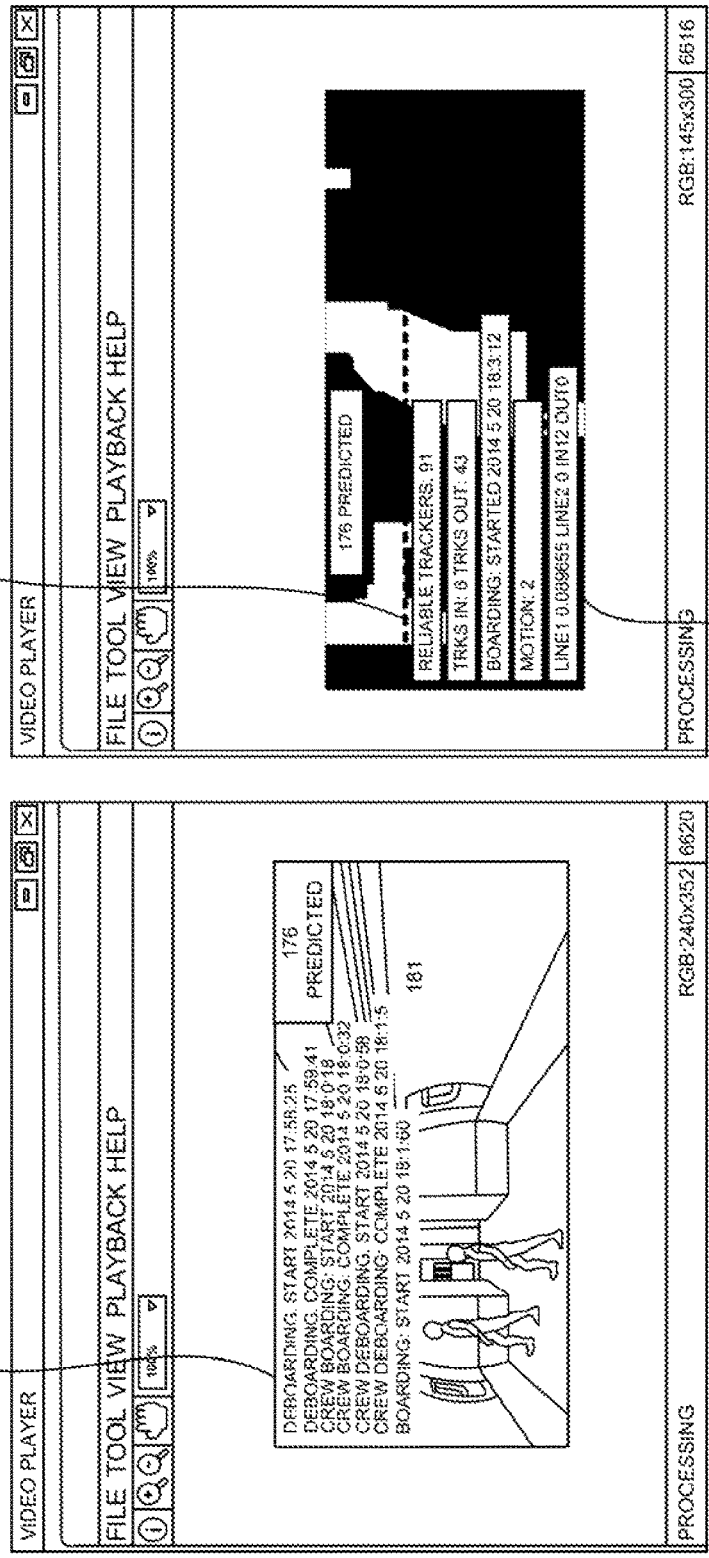

MANAGEMENT OF AIRCRAFT IN-CABIN ACTIVITIES OCCURING DURING TURNAROUND USING VIDEO ANALYTICS

RELATED APPLICATIONS

Benefit is claimed under 35 U.S.C. 119(a)-(d) to Foreign application Serial No. 819/CHE/2015 filed in India entitled "MANAGEMENT OF AIRCRAFT IN-CABIN ACTIVITIES OCCURRING DURING TURNAROUND USING VIDEO ANALYTICS", filed on Feb. 20, 2015, by AIRBUS GROUP INDIA PRIVATE LIMITED, which is herein incorporated in its entirety by reference for all purposes.

TECHNICAL FIELD

Embodiments of the present subject matter generally relate to aircraft in-cabin activities, and more particularly, to management of the aircraft in-cabin activities occurring during turnaround using video analytics.

BACKGROUND

Typically, airlines need reliable and real-time information on different cabin activities and events for managing and improving in-cabin activities and manpower deployment. This is part of turnaround optimization, which is generally a top priority for Airlines. Also, Airlines generally monitor aircraft cabin activities and events during turnaround of an aircraft for in-cabin activity management. Exemplary in-cabin activities include boarding, de-boarding, cleaning, and catering. For managing such in-cabin activities, typically airlines determine start and stop time stamps associated with such in-cabin activities. Existing methods may rely on the start and stop time stamps determined manually by the airline operators and/or ground handlers for the in-cabin activity management. However, manually determining the start and stop time stamps for the in-cabin activities may not be accurate and may result in inefficient management and optimization of in-cabin activities.

SUMMARY

A system and method for management of aircraft in-cabin activities during turnaround using video analytics are disclosed. According to one aspect of the present subject matter, real-time video feed of the aircraft cabin activities is obtained during the turnaround from at least one video camera disposed in an aircraft cabin. The obtained real-time video feed is then analyzed to determine time stamps and measure progress associated with each one of in-cabin activities of an aircraft during turnaround to manage and optimize the one or more in-cabin activities.

According to another aspect of the present subject matter, a system includes one or more video cameras and a computing system. Further, the computing system includes a video analytics tool to perform the method described above.

According to yet another aspect of the present subject matter, a non-transitory computer-readable storage medium for aircraft cabin activity management using video analytics, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein:

FIGS. 3A to 3J illustrate screen shots of captured still images, derived from video data, depicting bounding boxes and trackers used for video analytics to monitor and manage each in-cabin activity during boarding and de-boarding of passengers, according to one embodiment.

Figure 1:
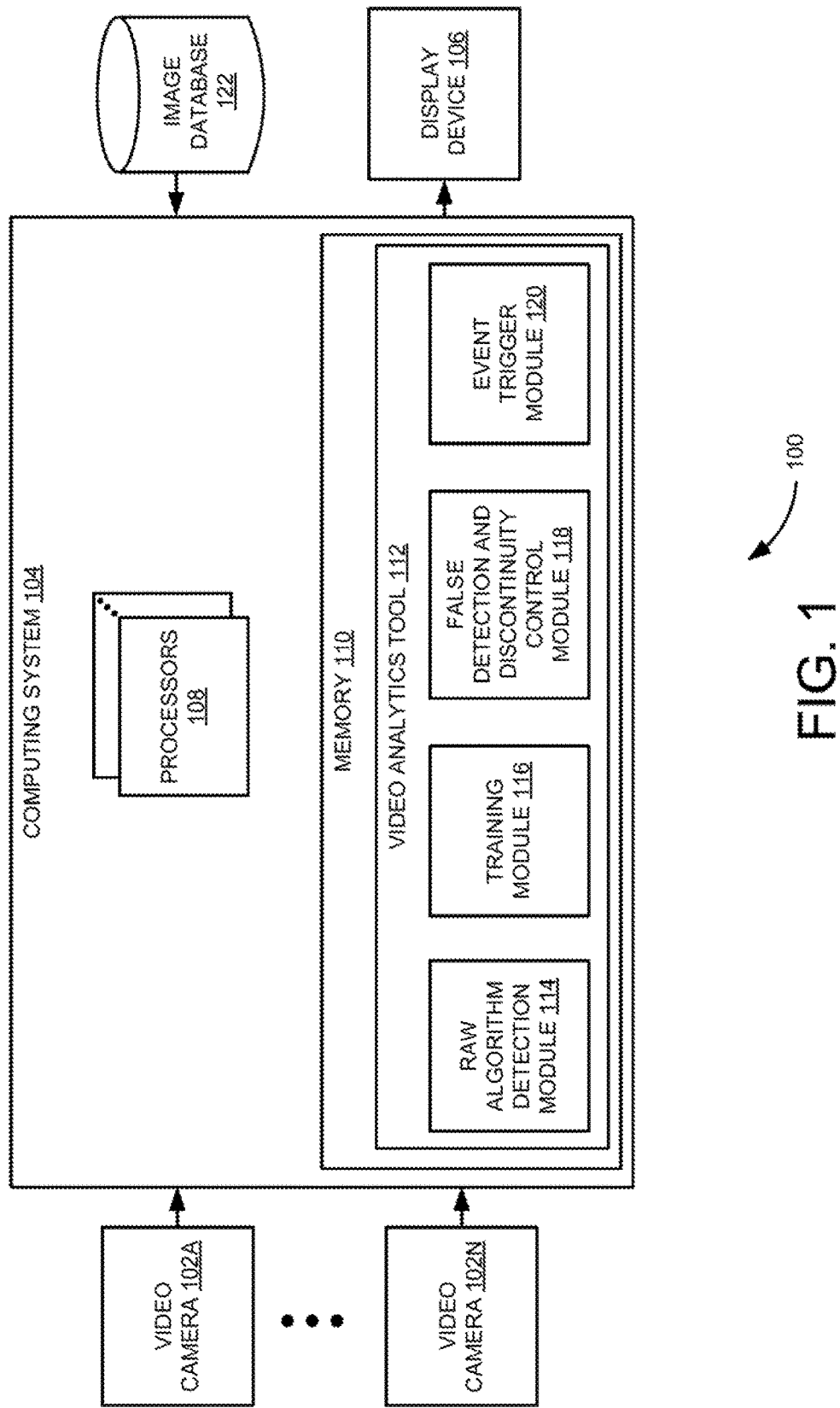
FIG. 1 is a block diagram illustrating an example video analytics system for aircraft in-cabin activity management using video analytics.

The drawings described herein are for illustration purposes only and are not intended to limit the scope of the present disclosure in any way.

DETAILED DESCRIPTION

A system and method for aircraft cabin activity management during turnaround using video analytics are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Embodiments described herein provide methods and systems for aircraft cabin activity management using video analytics. The example technique disclosed herein provides a video analytics tool for managing aircraft cabin activities of an aircraft during turnaround. Exemplary aircraft cabin activities include boarding, de-boarding, cleaning, catering, and the like. In one embodiment, the video analytics tool obtains real-time video data/feeds captured by one or more video cameras disposed at desired locations in an aircraft cabin. Further, the video analytics tool may be configured to determine time stamps associated with the aircraft cabin activities during turnaround by applying video analytics on the obtained video data to manage the aircraft cabin activities. For example, the video analytics tool determines time stamps and progress information for events such as boarding start, ongoing and stop, arrival and departure at gate, deboarding start, ongoing and stop, cleaning crew arrival and departure, and catering arrival and departure.

The present technique can be applied to any problem in engineering that requires accurate predictions, management and optimization of cabin activities, and do so in various fields (e.g., aeronautics, automobiles and the like). In aeronautics for example, the present technique can be applied to in-cabin areas, such as cockpit area, passenger cabin area, cargo area and the like.

In the present technique, video analytics available from video feeds from an aircraft cabin may be used to automatically monitor, manage and optimize aircraft cabin activities. Aircraft cabin activity time stamp and progress information associated with these in-cabin activities or events may be determined and sent to user devices, such as monitoring devices, mobile devices, and the like via a server. Further, analytics on the obtained aircraft cabin activity time stamp information may be performed to improve aircraft cabin activities. The process of obtaining aircraft cabin activity time stamps for the major activities or events may be automated such that no manual monitoring or intervention may be needed. Instructions regarding start, progress and stop of aircraft cabin activities may be sent from a server directly to airline ground handling staff. With data generated from these turn-around cycles, airlines can perform data analytics to enhance auditing and improving the aircraft activities during turnaround. Further, the obtained aircraft cabin activity stamps may then be used to predict beforehand the time of completion of these aircraft cabin activities, which can assist airlines to react and recover from any delays.

In one example, the above proposed video analytics technique is based on both people counting as well as motion check for computing/determining start activity time stamp, during/process activity time stamp and/or end activity time stamp associated with aircraft cabin activities or events. Further, the above technique provides a reliable and automated data collection to reduce dependencies on subjective data from airline and ground handlers. Furthermore, the above technique may significantly reduce need for physical audits for verification. Moreover, the above technique may not require any capital expenditure (Capex) investment for an airport as the proposed technique may leverage feeds available from video cameras already in disposed in aircraft cabins to obtain the needed video data.

In another example, the above solution enables aircraft cabin event or activity detection time stamps based on foreground detection, based on training of the video analytics algorithm on a vacant aircraft cabin or a cabin just before an activity start (e.g., with people seated before de-boarding activity) and subsequently detecting any movement and/or change in the people in the aircraft cabin. Also, various video cameras disposed in the aircraft cabin can be used for specific event or activity detection. It can be envisioned that some events may require multiple video camera feeds to facilitate and enhance detection of aircraft activity cabin activities.

The people counting and motion detection can be done by using cockpit door cameras or through cabin cameras. In addition to people counting, aircraft door movement can be detected and monitored and also physical objects like catering trolleys.

The terms "in-cabin" and "cabin" are being used interchangeably throughout the document. Further, the terms "events" and "activities" are being used interchangeably throughout the document. Also, the terms "video data" and "video feed" are being used interchangeably throughout the document. In addition, the terms "trackers" and "counter lines" are used interchangeably throughout the document.

Referring now to FIG. 1, which is a block diagram illustrating an example video analytics system 100 for aircraft in-cabin activity management using video analytics. As shown in FIG. 1, the system 100 includes one or more video cameras 102A-102N that are disposed inside an aircraft cabin area, a computing system 104, an image database 122 and a display device 106. Further as shown in FIG. 1, the computing system 104 includes one or more processors 108 and memory 110 communicatively coupled to the processors 108. Furthermore, the memory 110 includes a video analytics tool 112. In addition as shown in FIG. 1, the video analytics tool 112 includes a raw algorithm detection module 114, a training module 116, a false detection and discontinuity control module 118 and an event trigger module 120.

Further, the video cameras 102A-102N are communicatively connected to the computing system 104. For example, the computing system 104 may be a special purpose computing system or a general purpose computing system that is utilized to implement the video analytics tool 112. In this example, the computing system 104 may be present inside the aircraft, for example part of the aircraft flight management system. Further, the display device 106 is communicatively connected to the computing system 104. For example, the display device 106 can also be a part of the computing system 104. Furthermore as shown in FIG. 1, the image database 122 is coupled to the computing system 104. In one example, the image database 122 is used to store the video and image data such as those of catering trolleys, cargo pallets, cabin environments and the like.

In operation, the video cameras 102A-102N capture, in real-time, video data of aircraft cabin activities during turnaround. In one embodiment the video cameras 102A-102N capture video data of various aircraft cabin activities occurring during turnaround. In one example, the aircraft cabin activities include boarding (boarding start, boarding progress, and boarding finish), de-boarding (e.g., de-boarding start, de-boarding progress and de-boarding stop), cleaning (e.g., cleaning start and cleaning finish), and/or catering activities (e.g., catering start, catering progress, and catering stop).

Further in operation, the raw algorithm detection module 114 obtains the captured video data from the video cameras 102A-102N. In one embodiment, the raw algorithm detection module 114 obtains real-time video data from video cameras (e.g., one or more of the video cameras 102A-102N) disposed in the aircraft cabin such that the video cameras capture real-time video data of one or more aircraft cabin activities during turnaround. In one example, the video cameras 102A-102N may be disposed in aircraft cabin area selected from the group consisting of cockpit area, passenger area, galleys, and doors area such that the video cameras capture the video feed of the aircraft cabin during the turnaround period.

Further, the training module 116 trains each of video cameras with changing aircraft cabin environment parameters for a predetermined empty aircraft cabin time interval and/or until an associated aircraft cabin activity starts. For example, the aircraft cabin environment parameters, include but not limited to, aircraft cabin light based on time of day and/or aircraft cabin shadow based on time of day. Furthermore, the training module 116 assigns weights to the aircraft cabin environment parameters based on the training of each of the video cameras. The trained images may be stored in image database 122 for later use in video analytics to manage aircraft cabin activity management during turnaround time of the aircraft.

In one exemplary implementation, the in-cabin environment for which training has to be performed may be changing depending on the time of the day, lighting conditions, shadows falling on it, etc. basically ranging from dark to well-lighted up. The video analytics system may learn from the onset of any of the pre-event triggers, with weightage given to previously obtained background from training in that time and location. This ensures that system always has some standard data when differentiating foreground from background.

Furthermore, the event rigger module 120 determines aircraft cabin activity time stamps and measure progress associated with one or more aircraft cabin activities by applying video or data analytics on the obtained video feed. For example, the aircraft cabin activity time stamps include time stamps associated with start time, progress time, finish time and/or stop time of the one or more aircraft cabin activities.

In one example, the event trigger module 120 determine aircraft cabin activity time stamps associated with one or more aircraft cabin activities by applying video analytics on the obtained video feed based on the assigned weights. In another example, the event trigger module 120 manages the aircraft cabin activities using the determined aircraft cabin activity time stamps and the progress associated with the one or more aircraft cabin activities.

In one embodiment, the event trigger module 120 selects a bounded area of interest in the video feed coming from each of video cameras placed in the aircraft cabin, defines one or more count lines in the bounded area of interest in the video feed coming from each of the video cameras, and then determines the aircraft cabin activity time stamps associated with one or more aircraft cabin activities based on an object of interest in the bounded area of interest and crossing the defined one or more count lines. This is explained in detail with respect to FIGS. 2A-2D and 3A-3J. For example, the count lines include in-count lines and out-count lines, where each in-count line is used to monitor start of an aircraft cabin activity and each out-count line is used to monitor end of the associated aircraft cabin activity.

In one exemplary implementation, the event trigger module 120 determines white pixel count in the bounded area of interest in the video feed coming from each of the video cameras, determines whether an object of interest based on the white pixel count crosses the defined one or more count lines, and determines the aircraft cabin activity time stamps associated with one or more aircraft cabin activities when the white pixel count crossing the defined one or more count lines in the bounded area.

In another exemplary implementation, the event trigger module 120 performs motion detection to determine an object of interest in the bounded area of interest and crosses the defined one or more count lines, and determines the aircraft cabin activity time stamps associated with one or more aircraft cabin activities based on the object of interest in the bounded area of interest and crossing the defined one or more count lines. The video analytics tool 112 may capture event detection times using a machine learning algorithm (e.g., a local binary partition algorithm) which can be trained and subsequently used for object detections.

In one exemplary implementation, the aircraft cabin activity detections can be leveraged to identify time stamps of various activities using following example logic:
  a) De-boarding start: passenger (PAX) door open+first PAX exit.
  b) De-boarding progress: count approximate number of passengers (PAX) in the video feed, compare with total PAX count and calculate de-boarding progress in percentage (%).
  c) De-boarding stop: last PAX exit (e.g., time gap after last exit >45 secs)+de-boarding progress >90%+empty Seats.
  d) Cleaning start: after de-boarding stop+people entering in groups (e.g., 3-4 people)+aisle movement (continuous)+empty seats+dress code.
  e) Cleaning finish: cleaning when people exit in groups (e.g., 3-4)+aisle movement stopped.
  f) Boarding start: After cleaning finish+PAX entry+rate of incoming+aisle movement+seat occupancy.
  g) Boarding progress: count PAX roughly in the video feed, compare with total PAX count and calculate boarding progress in percentage, or monitor cabin seat occupancy in the video feed.
  h) Boarding finish: last PAX entry (e.g., time gap after last entry >45 sec)+Boarding progress >90%.
  i) Catering start: catering door open+First catering trolley out.
  j) Catering progress: catering trolleys/boxes moving in and out of galley area.
  k) Catering stop: catering door close.

At each of the above event detections, a snapshot from the cabin cameras can be taken and send to ground handling personnel for cross verification.

The false detection and discontinuity control module 118 detects any false detections that may arise out of wrongful detections and noise generated in the video data and filters out the false detections by labelling or considering only those detections that are continuously detected over pre-decided threshold frames. Further, false detection and discontinuity control module 118 removes the detections that are lost after certain number of frames have passed. Also, the false detection and discontinuity control module 118 may use the Kalman filter model working on user-defined motion patterns to remove certain objects which are not visible for certain frames. Depending on environment, camera position and queue, passenger movement might be with a fixed velocity. For example, bounded area of interests determined from Kalman filter, are distributed according to the Hungarian algorithm, which categorizes the detections in a new frame into old trackers and new object trackers, using distance metric from previous location.

Further, the event trigger module 120 uses constraints and logic (e.g., as discussed above) that are observed and arrived after due diligence to improve event trigger, based on the knowledge of the cabin activities. For example, the event trigger may include setting automatic primitive trigger delay for de-boarding completion, calculated based on passengers aboard the aircraft.

The exemplary implementation of a prototype aircraft cabin activity on video feeds coming from different cameras inside the aircraft, monitoring passenger movement and providing corresponding timestamps, is described as follows. The parameters used for implementing the prototype aircraft cabin activity include:
  a. Training period duration: The training period duration may include making a development model by assimilating data from multiple continuous video frames. The Gaussian mixture models may be used to differentiate between the foreground and background pixels. More the number of frames, more the contrast evident between foreground and background pixels. Further, the motion of people or passengers in the training period is subdued due to a substantially larger data set.
  b. Mask: This parameter may provide/show the location of foreground pixels in a binary format. The objects in the images can be seen as connected blobs obtained after applying morphological operations.

c. Bounding area limit: The bounding area limit is predefined according to the camera positions in the aircraft cabin and defines the limits of the object size to be detected.

d. Trackers: The trackers show the bounded area over connected blobs in the mask.

e. Reliable tracker counter: The reliable tracker counter may be used for removal of noise and tracking the same object moving in the video frame with some or desired confidence. Higher the counter value, more confidence may be gained in terms of object motion and direction.

f. Bounded area for people counting. The bounded area for people counting refers to an area selected with a stable, contrasting background such as a fixed wall of colour white. When an object comes in front of the wall, it shows up in the binary mask. Also, the dimensions of bounded area are such that only one object of interest can be able to cross the area or line up one at a time, making people counting easy and reliable. For example, the bounded area can be a rectangle.

g. Count-line: The count-line is defined inside the bounded area for people counting. Once the object blob crosses this line, a respective in or out counter can be incremented.

h. Alpha-second time interval: A value of alpha denotes time intervals after which a call on whether sufficient motion is happening or not is taken based on the tracker activity and people counter values.

i. Motion-count: A motion-count is a parameter that tries to quantify the amount of motion happening in the bounded area of interest. The weightage is given to both new initializations, amount of directional movement of trackers and counter value increments, giving finally an integral value of motion-count parameter. As evident, the value may be dependent on choosing appropriate alpha-second time interval. The shorter value continuously gives zero motion-count and the longer value accumulates the movement and processes it after longer duration of time, thereby not giving exact time-stamp for events. Also, the larger value of the alpha-second time interval may include more than one event leading to event initiation or termination or loss of information. For example, de-boarding end and cleaning crew entry falling in the same interval, where system may misconstrue cleaning activity as passenger movement.

Further, the training module 116 of the video analytics tool 112 starts training by capturing and storing the frames for the "training period duration" parameter, to come up with a Gaussian model. Also, the training module 116 may assign a weightage to the predefined models that are recorded earlier, which may help in identifying background information if there is a significant motion in front of the video cameras during the training period. The training period needs to be timed before start of the people counting counter to ensure accuracy in environment detection. The trigger for training start can be cabin door opening/closing or when an aircraft taxi begins or ends, which is communicated to the server.

After the training completes, the background estimate may be continuously changed or learned, where the learning rate can be defined according to the conditions. This may ensure that a stationary object introduced into the video frame for long period of time such as food trolley, handbag, and the like, become part of the background eventually. This may ensures to treat the relevant moving objects as foreground and not stationary objects that may be relatively new to the background.

Figure 2B:
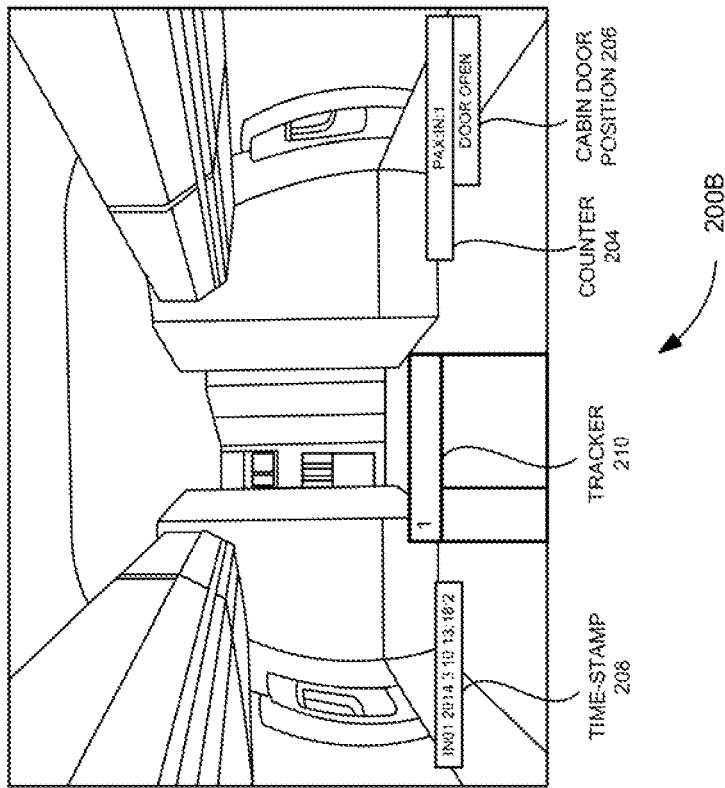
FIGS. 2A to 2D illustrate example images, including time stamp information of aircraft cabin activities, captured by a video camera disposed around cockpit area of an aircraft.
Figure 2A:
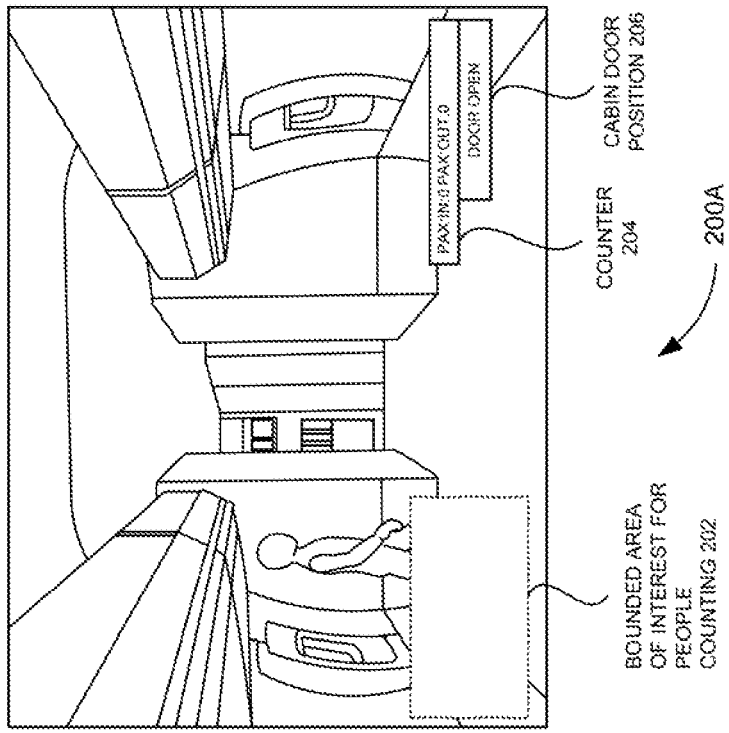
Figure 2D:
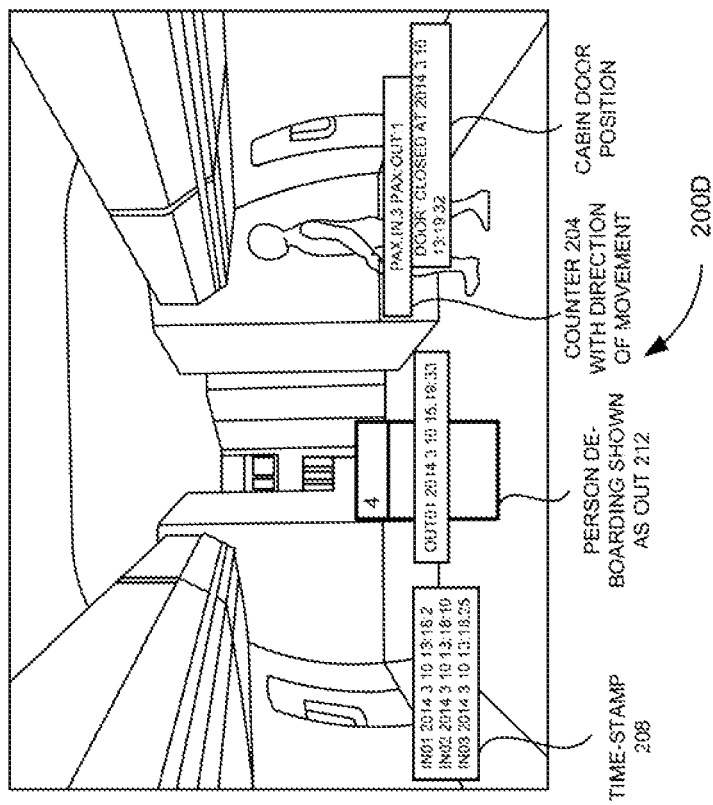
Figure 2C:
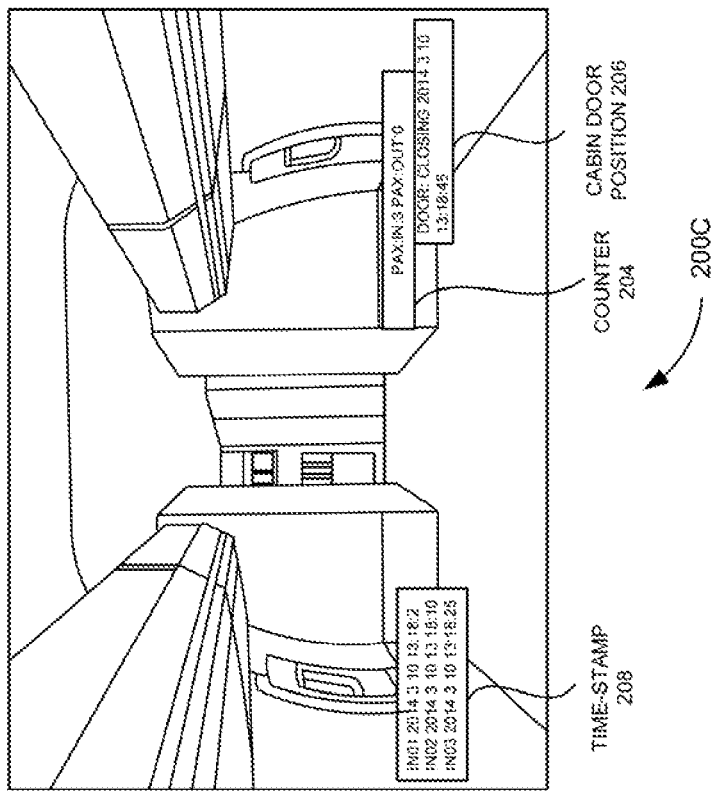

FIGS. 2A to 2D illustrate example images 200A-200D, including time stamp information of aircraft cabin activities, captured by a video camera disposed around cockpit area of an aircraft. Particularly, FIG. 2A illustrates a bounded area of interest 202 used for counting people, a counter 204 for counting the number of people crossing the bounded area 202, and a cabin door position 206. Further, FIG. 2B shows a time stamp 208 displayed when a first person boards the aircraft, and a tracker 210 to track moving of the object in the video frame. FIG. 2C shows progress associated with boarding of passengers and a time stamp 208 associated with each passenger, and FIG. 2D shows a passenger de-boarding the aircraft 212 and the counter 204 indicating a final value based the tracked movement of people in the bounded area.

Particularly, FIGS. 2A-2D illustrate analysis of cockpit camera video feed, where the bounded area 202 of people counting is selected in such away that people passes over the bounded area and is clearly visible in the mask. For people counting, the shadow of the object might be taken as the object itself in foreground detection and needs to be corrected. This is corrected by converting the video frame into a hue-saturation-value (HSV) format and separates 'luma' or image intensity from colour information. The shadow may cause only the change in intensity part when compared with the background image and not affecting the colour information layer. In one example, the counting of the moving object is performed by counting white pixels on the centre of the mask, and adding to the people counting counter when the white pixels exceeds a certain threshold. Further, the counter (e.g., counter 204) is tuned according to the speed of the object, to avoid counting the subjects multiple times.

To make sure the direction of movement of the object, the pixel counts on the edges of the bounded area 202 are also noted with the video frames, after a threshold is crossed on either of them. To improve the accuracy more number of the pixel counts at equal intervals are considered and then analysed to get the direction of movement inside the bounded area of interest.

Figure 3B:
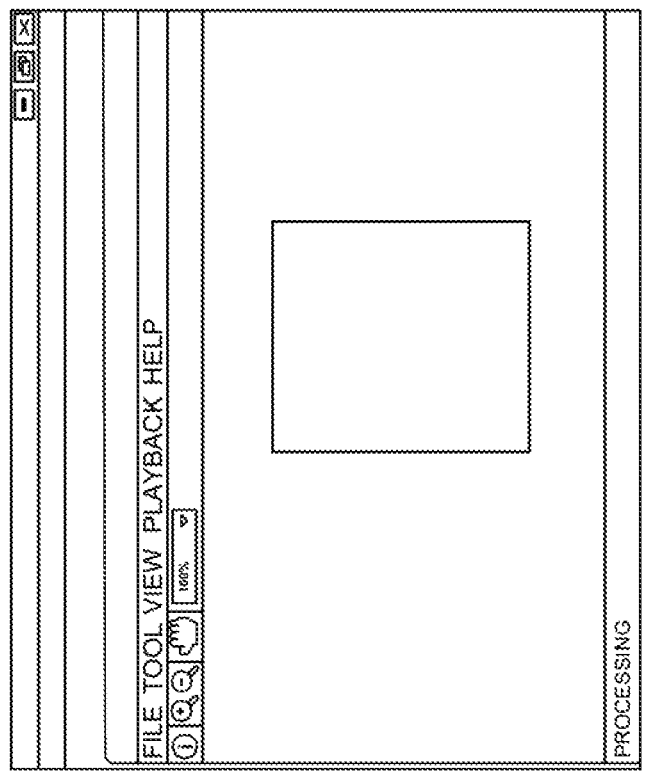
Figure 3A:
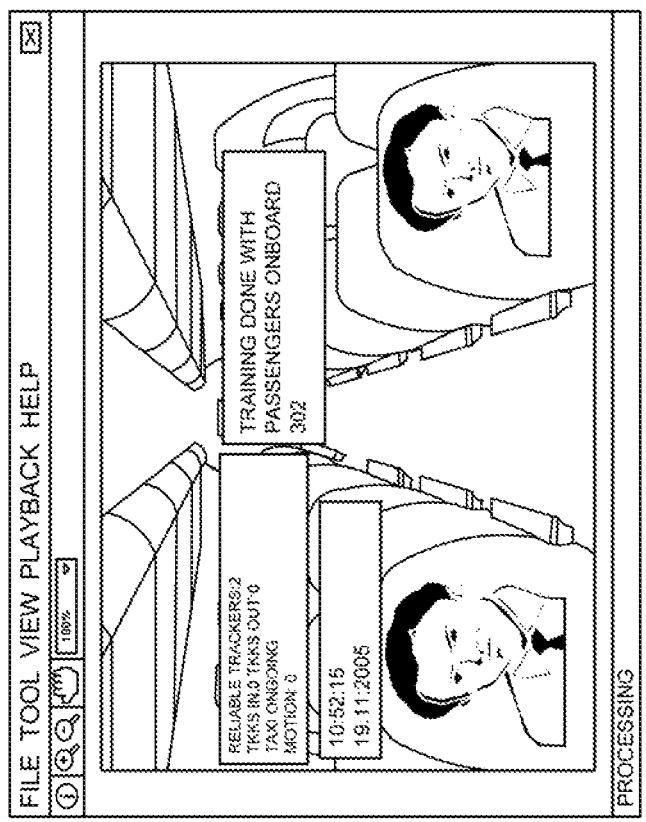
Figure 3E:
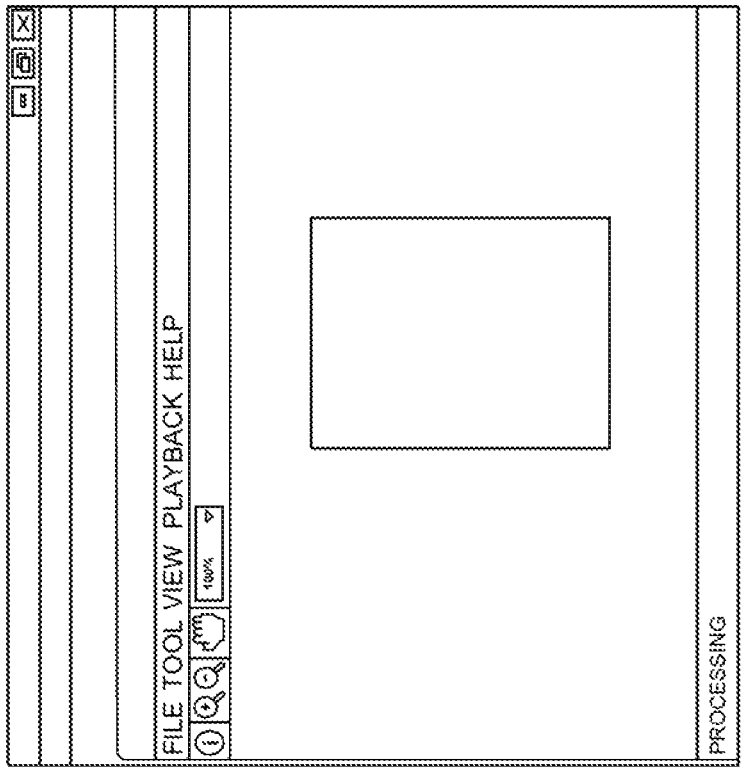
Figure 3F:
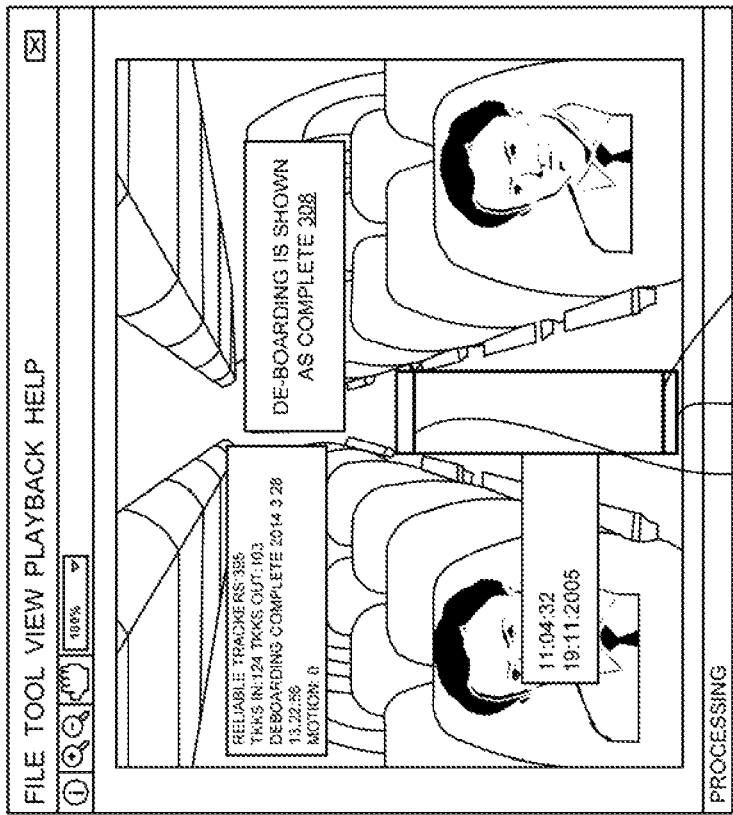

FIGS. 3A to 3F illustrate screen shots of captured images 300A-300F, derived from video data, depicting bounded areas and trackers used for video analytics to monitor and manage each in-cabin activity during boarding and de-boarding of passengers, according to one embodiment. Particularly, FIG. 3A illustrates performing training with passengers onboard the aircraft (e.g., 302) and FIG. 3B illustrates a background image corresponding to the FIG. 3A, when there are no moving objects of interest. FIG. 3C shows trackers for a motion count 304 indicating tracking of the objects moving in the frame with a predefined confidence and an approximate number of passengers moving in and out of the bounded area of interest. FIG. 3D illustrates a binary mask corresponding to the FIG. 3C, showing the tracked object blobs 306. FIG. 3E illustrates de-boarding activity 308 based on in count-line 312 and out count-line 314 in the bounded area of interest 310 in the video feed coming from each of the video cameras. FIG. 3F illustrates a background image corresponding to the FIG. 3E, where there are no moving objects of interest after de-boarding activity is completed.

With reference to FIGS. 3A-3F, the cameras can be mounted in such a way that the whole cabin is visible in frames and hence the people counting may become difficult as the passengers move in or out of the frame. In this case, the exact number of passenger count is not required to obtain the time log of the event of boarding/de-boarding completion. Instead based on the amount of movement in the aisle, the time-log can be estimated as described below.

The aisle may be taken as the bounded area of interest (e.g., 310), as the movement occurs in the aisle. The foreground detection identifies object blobs, generates trackers, and upon 'Reliable tracker counter' threshold is crossed, the time stamps, progress information, and motion count can be shown through the bounded areas with labels. For example, the bounded area may cover a moving part, for example, a hand or legs or torso. The tracker centroid movement is recorded from initial position to final position until the centroid movement remains visible in the frame, and distance is recorded for each tracker.

The in counter or out counter can be incremented once the bounded area centroid crosses the count-line, after moving a threshold distance in the defined direction, for example, minimum vertical length is of 50 percent of bounded area's vertical length. In or out counter increments and new tracker initialization can be recorded for each alpha-second time interval and for given a parameter (i.e., motion-count).

If the motion-count is zero for any interval, then the forthcoming time-interval is shortened. If motion-count is zero for consecutive intervals, then the system may trigger the event time-log for end of boarding or de-boarding. The shortening of time intervals may increase the accuracy and avoid inclusion of two event triggers in same interval. As shown in FIGS. 3A-3F, boarding or de-boarding start timestamp is recorded, once the motion count increases from zero to substantially higher value, for example 2 or 3. This may differentiate the mass movement of passengers in one direction from infrequent movements in the aisle by crew or passengers.

Figure 3G:
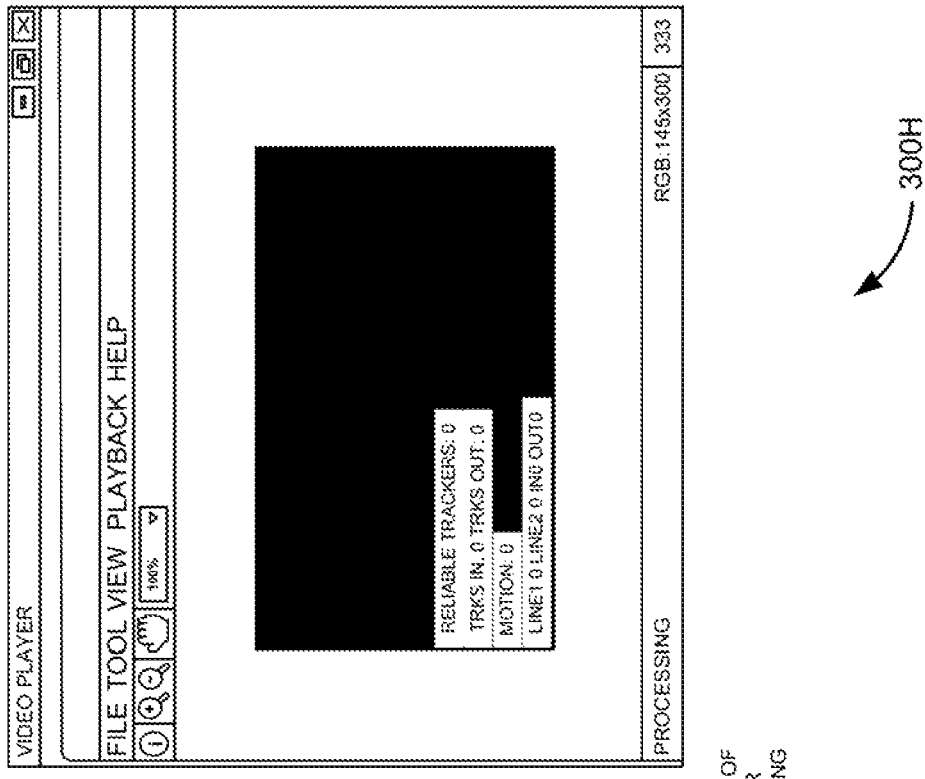
Figure 3H:
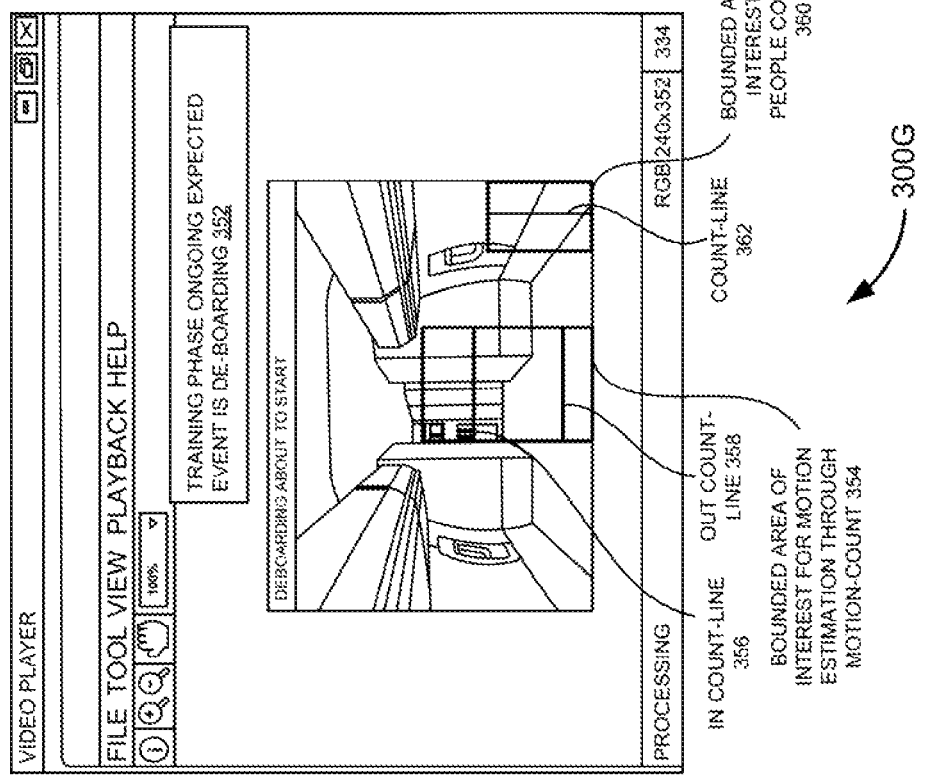

FIGS. 3G to 3J illustrate example images 300G-300J, including time stamp information and motion count metric of aircraft cabin activities. FIG. 3G illustrates training phase ongoing de-boarding activity (e.g., 352) based on bounded area of interest for motion estimation 354 and bounded area of interest for people counting 360 in the video feed coming from each of the video cameras and FIG. 3H illustrates a background image corresponding to the FIG. 3G, when there are no moving objects of interest. Also, FIG. 3G depicts the in count line 356 and out count line 358 in the bounded area of interest 354 and count line 362 in the bounded area of interest for people counting 360, in the video feed coming from each of the video cameras. FIG. 3I shows events displayed along with the time-stamps 364 and FIG. 3J illustrates a binary mask corresponding to the FIG. 3I, showing the tracked object blobs and motion count metric along with current ongoing event information and trackers 366 and people counting and direction indicators 368.

In FIGS. 3G-3J, different aircraft cabin activity timestamps are displayed by combining people count and motion-count techniques used in cockpit camera and cabin aisle camera analysis, respectively. The number of passengers boarding and de-boarding, number of cleaning crew, etc. may be communicated to the system and event triggers can be derived out of both motion around the door and number of people counted. This may be required as the number of people counted might not be accurate due to rapid movements, children carried by parents, etc., and the motion-count trigger may be inefficient in prediction of end and start of events due to people movements, such as older waiting till the end and moving very slowly, and continuous crew movement.

The combination of two techniques works in tandem and complements each other in terms of information and may give confidence to event triggers. In one exemplary implementation, a bounded area of interest is selected near the door, in front of a fixed panel, used for people counting. For motion-count, the bounded area of interest is taken as the floor space, providing the movement parameter and crowding around the door. Training part may be completed once the door is opened and detected. For de-boarding, the number of people moving out may be continuously calculated and once it reaches a predefined threshold (e.g., 90%) of stated value, the system relies on motion-count to predict the end of de-boarding when there is less or zero movement around the door. Once the time stamp for de-boarding end is recorded, then the system waits for cleaning crew to show up and then log cleaning crew board time. Since, the cleaning crew will be less in number when compared with passengers, and generally move in groups, the alpha-second time interval would be shortened.

For greater confidence, regarding flight crew, cleaning crew and technician movement differentiation using uniforms, LBP based detection algorithms needs to be employed to predict the cleaning crew movement. For aircrafts equipped with multiple cameras, the information from the relevant ones may need to collate in real-time for event detection.

The false detections (e.g., detecting an object where it does not really exist) can be minimized by the use of Kalman filter based algorithm for predicting the motion of the object and usage of 'Reliable Tracker Counter' parameter, which basically records the number of frames a particular object has been detected on the frame. Once the number of consecutive detections crosses a predefined threshold, then the bounded area is allocated and becomes visible on the user interface.

Some practical values on the event times for different aircrafts during the testing and human monitored phase of the software may have to be included, like boarding average times, and the like. Also, with enough data, the boarding times with the number and profile of passengers can be predicted and the next course of action like alerting the refueling or cleaning crew can be done in advance, thus ensuring optimum utilization of resources and significant decrease in turn-around times for aircraft.

Figure 4:
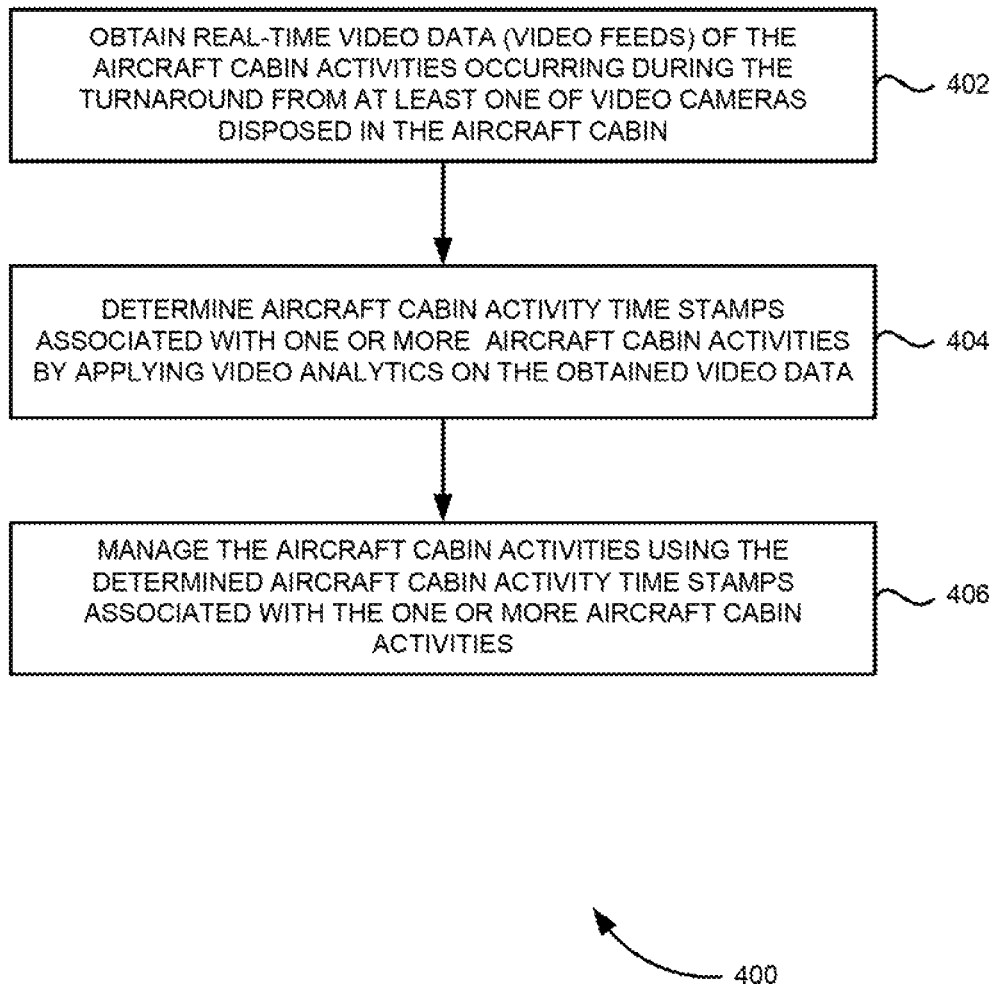
FIG. 4 is a flow diagram illustrating an example method for management of aircraft in-cabin activities occurring during turnaround using video analytics.

FIG. 4 is a flow diagram 400 illustrating an example method for management of aircraft in-cabin activities during turnaround using video analytics. At block 402, real-time video feed of the aircraft cabin activities during the turnaround is obtained from at least one video camera disposed in an aircraft cabin. In one example implementation, the at least one video camera is disposed in aircraft cabin area selected from the group consisting of cockpit area, passenger area, galleys, and doors area such that the at least one video camera captures the video feed of the aircraft cabin during the turnaround period. For example, The method of claim 1, the aircraft cabin activities includes activities selected from the group consisting of boarding, de-boarding, cleaning, and catering.

At step 404, aircraft cabin activity time stamps associated with one or more aircraft cabin activities are determined and progress associated with one or more aircraft cabin activities is measured by applying video analytics on the obtained video feed. For example, the aircraft cabin activity time stamps include time stamps associated with start time, progress time, finish time and/or stop time of the one or more aircraft cabin activities.

In this case, each of video cameras is trained with changing aircraft cabin environment parameters for a predetermined empty aircraft cabin time interval and/or until an associated aircraft cabin activity starts. For example, the aircraft cabin environment parameters are aircraft cabin light based on time of day and/or aircraft cabin shadow based on time of day. Further, weights are assigned to the aircraft cabin environment parameters based on the training of each of the video cameras. Furthermore, aircraft cabin activity time stamps are determined and the progress associated with one or more aircraft cabin activities is measure by applying video analytics on the obtained video feed based on the assigned weights.

In one example, the aircraft cabin activity time stamps are determined and the progress associated with the one or more aircraft cabin activities are measured by selecting a bounded area of interest in the video feed coming from each of video cameras placed in the aircraft cabin, defining one or more count lines in the bounded area of interest in the video feed coming from each of the video cameras, and determining the aircraft cabin activity time stamps and measure the progress associated with one or more aircraft cabin activities based on an object of interest in the bounded area and crossing the defined one or more count lines. For example, the count lines comprise in-count lines and out-count lines, where each in-count line is used to monitor start of an aircraft cabin activity and each out-count line is used to monitor end of the associated aircraft cabin activity.

In one exemplary implementation, the aircraft cabin activity time stamps are determined and the progress is measures by determining white pixel count in the bounded area of interest in the video feed coming from each of the video cameras and determining whether an object of interest based on the white pixel count crosses the defined one or more count lines. In another exemplary implementation, the aircraft cabin activity time stamps are determined and the progress is measured by performing motion detection to determine an object of interest in the bounded area and crossing the defined one or more count lines.

At step 406, the aircraft cabin activities are managed using the determined aircraft cabin activity time stamps and the progress associated with the one or more aircraft cabin activities.

Figure 5:
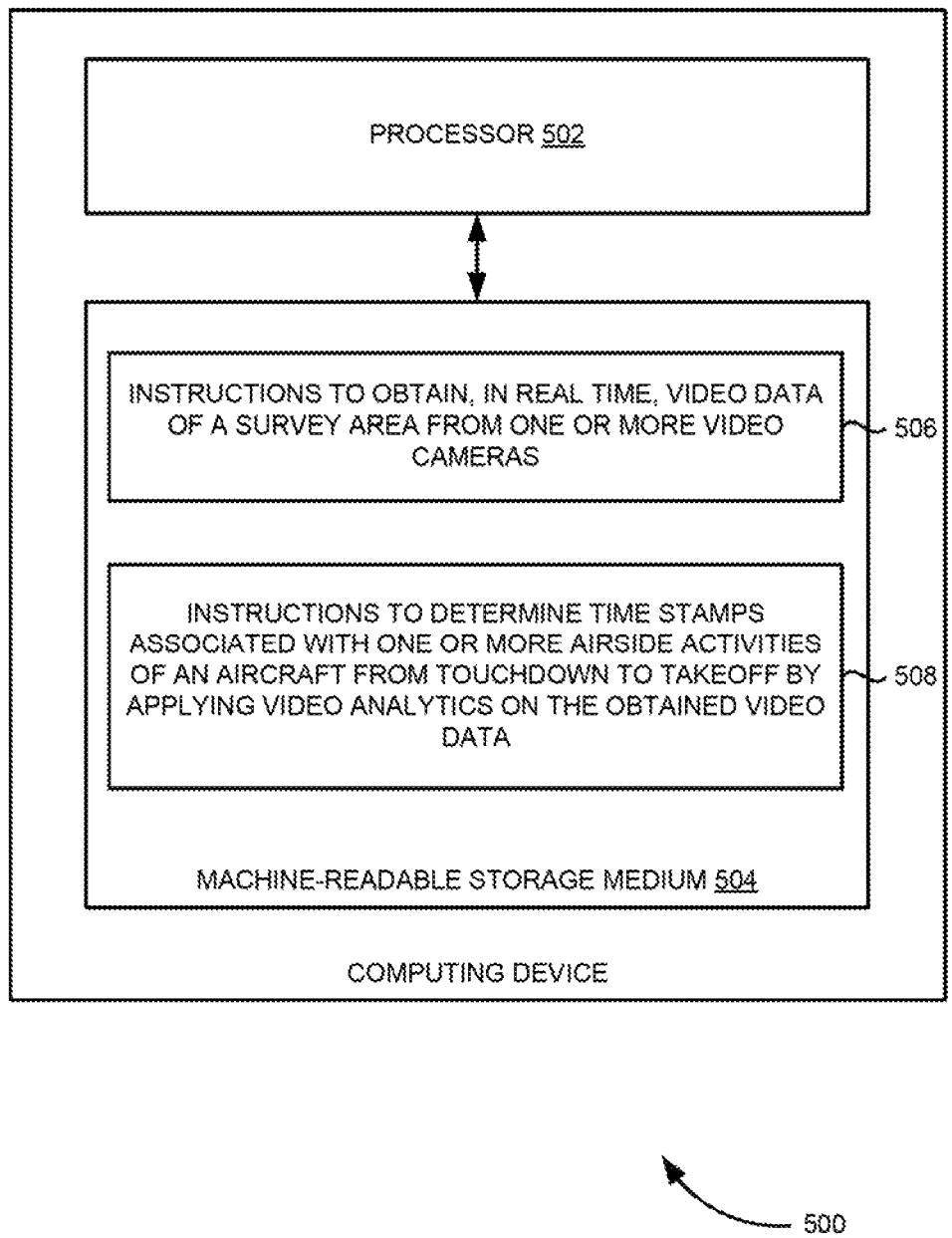
FIG. 5 is a block diagram of a computing device for managing in-cabin activities using video analytics, according to one embodiment.

Referring now to FIG. 5, which illustrates a block diagram 500 of an example computing device 500 for managing aircraft cabin activities occurring during turnaround using video analytics. The computing device 500 includes a processor 502 and a machine-readable storage medium 504 communicatively coupled through a system bus. In an example, the computing device 500 may be analogous to the computing system 104 of FIG. 1. The processor 502 may be any type of a central processing unit (CPU), a microprocessor, or processing logic that interprets and executes machine-readable instructions stored in the machine-readable storage medium 504. The machine-readable storage medium 504 may be a random access memory (RAM) or another type of dynamic storage device that may store information and machine-readable instructions that may be executed by the processor 502. For example, the machine-readable storage medium 504 may be synchronous DRAM (SDRAM), double data rate (DDR), rambus DRAM (RDRAM), rambus RAM, etc. or a storage memory media such as a floppy disk, a hard disk, a CD-ROM, a DVD, a pen drive, and the like. In an example, the machine-readable storage medium 504 may be a non-transitory computer-readable storage medium. The machine-readable storage medium 504 may store instructions 506 and 508.

In an example, the instructions 506 may be executed by the processor 502 to obtain, in real time, video data of aircraft cabin activities during turnaround from at least one video camera. The instructions 508 may be executed by the processor 502 to determine aircraft cabin activity time stamps and measure progress associated with one or more aircraft cabin activities by applying video analytics on the obtained video feed and manage the aircraft cabin activities using the determined aircraft cabin activity time stamps and the progress associated with the one or more aircraft cabin activities.

In various embodiments, the systems and methods described in FIGS. 1 through 5 propose a technique for managing aircraft cabin activities using video analytics. The proposed technique determines time stamps and measure progress associated with aircraft cabin activities by applying video analytics on captured video data. The automatically obtained time stamps determined herein are reliable, thus reducing dependency on subjective data obtained by airline operators and cabin crew and the like. Further, the determined time stamps and the measure progress information may be used for optimizing turnaround activities of aircrafts.

Although certain methods, systems, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for managing aircraft cabin activities during turnaround using video analytics, comprising:
   obtaining real-time video feed of the aircraft cabin activities during the turnaround from at least one video camera disposed in an aircraft cabin;
   training the at least one video camera with changing aircraft cabin environment parameters;
   assigning weights to the aircraft cabin environment parameters based on the training of the at least one video camera;
   determining aircraft cabin activity time stamps and measuring progress associated with one or more of the aircraft cabin activities by applying video analytics on the obtained video feed based on the assigned weights; and
   managing the aircraft cabin activities using the determined aircraft cabin activity time stamps and the progress associated with the one or more aircraft cabin activities.

2. The method of claim 1, wherein
the at least one video camera is trained with the changing aircraft cabin environment parameters for a predetermined empty aircraft cabin time interval and/or until an associated aircraft cabin activity starts, wherein the aircraft cabin environment parameters are aircraft cabin light based on time of day and/or aircraft cabin shadow based on time of day.

3. The method of claim 1, wherein the at least one video camera is disposed in aircraft cabin area selected from the group consisting of cockpit area, passenger area, galleys, and doors area such that the at least one video camera captures the video feed of the aircraft cabin during the turnaround.

4. The method of claim 1, wherein the aircraft cabin activities comprises activities selected from the group consisting of boarding, de-boarding, cleaning, and catering.

5. The method of claim 1, wherein the aircraft cabin activity time stamps comprise time stamps associated with start time, progress time, finish time and/or stop time of the one or more aircraft cabin activities.

6. A method for managing aircraft cabin activities during turnaround using video analytics, comprising:
 obtaining real-time video feed of the aircraft cabin activities during the turnaround from at least one video camera disposed in an aircraft cabin;
 determining aircraft cabin activity time stamps and measuring the progress associated with one or more aircraft cabin activities by applying video analytics on the obtained video feed, comprising:
  selecting a bounded area of interest in the video feed coming from the at least one video camera placed in the aircraft cabin;
  defining one or more count lines in the bounded area of interest in the video feed coming from the at least one video camera; and
  determining the aircraft cabin activity time stamps and measuring the progress associated with the one or more aircraft cabin activities based on an object of interest in the bounded area of interest and crossing the defined one or more count lines; and
 managing the aircraft cabin activities using the determined aircraft cabin activity time stamps and the progress associated with the one or more aircraft cabin activities.

7. The method of claim 6, wherein determining the aircraft cabin activity time stamps and measuring the progress associated with the one or more aircraft cabin activities based on the object of interest in the bounded area of interest and crossing the defined one or more count lines, comprises:
 determining white pixel count in the bounded area of interest in the video feed coming from the at least one video camera;
 determining whether an object of interest based on the white pixel count crosses the defined one or more count lines; and
 determining the aircraft cabin activity time stamps and measuring the progress associated with the one or more aircraft cabin activities based on the white pixel count in the bounded area of interest and crossing the defined one or more count lines.

8. The method of claim 6, wherein determining the aircraft cabin activity time stamps and measuring the progress associated with the one or more aircraft cabin activities based on the object of interest in the bounded area of interest and crossing the defined one or more count lines, comprises:
 performing motion detection to determine an object of interest in the bounded area of interest and crossing the defined one or more count lines; and
 determining the aircraft cabin activity time stamps and measuring the progress associated with the one or more aircraft cabin activities based on the object of interest in the bounded area of interest and crossing the defined one or more count lines.

9. The method of claim 6, wherein the count lines comprise in-count lines and out-count lines, wherein each in-count line is used to monitor start of an aircraft cabin activity and each out-count line is used to monitor end of the associated aircraft cabin activity.

10. A video analytics system, comprising:
 at least one video camera disposed inside an aircraft cabin; and
 a computing system communicatively coupled to the at least one video camera, wherein the computing system comprises a video analytics tool to:
  obtain real-time video feed of aircraft cabin activities during turnaround from the at least one video camera disposed in the aircraft cabin;
  train the at least one video camera with changing aircraft cabin environment parameters;
  assign weights to the aircraft cabin environment parameters based on the training of the at least one video camera;
  determine aircraft cabin activity time stamps and measure progress associated with one or more aircraft cabin activities by applying video analytics on the obtained video feed based on the assigned weights; and
  manage the aircraft cabin activities using the determined aircraft cabin activity time stamps and the progress associated with the one or more aircraft cabin activities.

11. The system of claim 10, wherein the at least one video camera is trained with the changing aircraft cabin environment parameters for a predetermined empty aircraft cabin time interval and/or until an associated aircraft cabin activity starts, wherein the aircraft cabin environment parameters are aircraft cabin light based on time of day and/or aircraft cabin shadow based on time of day.

12. The system of claim 10, wherein the at least one video camera is disposed in aircraft cabin area selected from the group consisting of cockpit area, passenger area, galleys, and doors area such that the at least one video camera captures the video feed of the aircraft cabin during the turnaround.

13. The system of claim 10, wherein the aircraft cabin activities comprises activities selected from the group consisting of boarding, de-boarding, cleaning, and catering.

14. The system of claim 10, wherein the aircraft cabin activity time stamps comprise time stamps associated with start time, progress time, finish time and/or stop time of the one or more aircraft cabin activities.

15. A video analytics system, comprising:
 at least one video camera disposed inside an aircraft cabin; and
 a computing system communicatively coupled to the at least one video camera, wherein the computing system comprises a video analytics tool to:
  obtain real-time video feed of aircraft cabin activities during turnaround from the at least one video camera disposed in the aircraft cabin;
  determine aircraft cabin activity time stamps and measure progress associated with one or more aircraft cabin activities by applying video analytics on the obtained video feed, wherein the video analytics tool is to:
   select a bounded area of interest in the video feed coming from the at least one video camera placed in the aircraft cabin;
   define one or more count lines in the bounded area of interest in the video feed coming from the at least one video camera; and
   determine the aircraft cabin activity time stamps and measure the progress associated with the one or more aircraft cabin activities based on an object of interest in the bounded area of interest and crossing the defined one or more count lines; and
  manage the aircraft cabin activities using the determined aircraft cabin activity time stamps and the progress associated with the one or more aircraft cabin activities.

16. A non-transitory computer readable storage medium including instructions that are configured, when executed by a computing device, for aircraft cabin activity management during turnaround using video analytics, the method comprising:

obtaining real-time video feed of aircraft cabin activities during the turnaround from at least one video camera disposed in an aircraft cabin;

training the at least one video camera with changing aircraft cabin environment parameters;

assigning weights to the aircraft cabin environment parameters based on the training of the at least one video camera;

determining aircraft cabin activity time stamps and measuring progress associated with one or more aircraft cabin activities by applying video analytics on the obtained video feed based on the assigned weights; and managing the aircraft cabin activities using the determined aircraft cabin activity time stamps and the progress associated with the one or more aircraft cabin activities.

17. The non-transitory computer readable storage medium of claim 16, wherein the at least one video camera is trained with the changing aircraft cabin environment parameters for a predetermined empty aircraft cabin time interval and/or until an associated aircraft cabin activity starts, wherein the aircraft cabin environment parameters are aircraft cabin light based on time of day and/or aircraft cabin shadow based on time of day.

18. The non-transitory computer readable storage medium of claim 16, wherein the at least one video camera is disposed in aircraft cabin area selected from the group consisting of cockpit area, passenger area, galleys, and doors area such that the at least one video camera captures the video feed of the aircraft cabin during the turnaround.

19. The non-transitory computer readable storage medium of claim 16, wherein the aircraft cabin activities comprises activities selected from the group consisting of boarding, de-boarding, cleaning, and catering.

20. The non-transitory computer readable storage medium of claim 16, wherein the aircraft cabin activity time stamps comprise time stamps associated with start time, progress time, finish time and/or stop time of the one or more aircraft cabin activities.

21. A non-transitory computer readable storage medium including instructions that are configured, when executed by a computing device, for aircraft cabin activity management during turnaround using video analytics, the method comprising:

obtaining real-time video feed of the aircraft cabin activities during the turnaround from at least one video camera disposed in an aircraft cabin;

determining aircraft cabin activity time stamps and measuring progress associated with one or more aircraft cabin activities by applying video analytics on the obtained video feed, comprising:

selecting a bounded area of interest in the video feed coming from the at least one video camera placed in the aircraft cabin;

defining one or more count lines in the bounded area of interest in the video feed coming from the at least one video camera; and determining the aircraft cabin activity time stamps and measuring the progress associated with the one or more aircraft cabin activities based on an object of interest in the bounded area of interest and crossing the defined one or more count lines; and managing the aircraft cabin activities using the determined aircraft cabin activity time stamps and the progress associated with the one or more aircraft cabin activities.

* * * * *